(12) United States Patent
Shimizu

(10) Patent No.: US 8,953,783 B2
(45) Date of Patent: Feb. 10, 2015

(54) ARITHMETIC DEVICE

(75) Inventor: Hideo Shimizu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 13/568,393

(22) Filed: Aug. 7, 2012

(65) Prior Publication Data

US 2013/0202105 A1 Aug. 8, 2013

(30) Foreign Application Priority Data

Aug. 26, 2011 (JP) .................................. 2011-184938

(51) Int. Cl.
*G06F 21/00* (2013.01)
*H04L 9/28* (2006.01)
*H04L 9/06* (2006.01)

(52) U.S. Cl.
CPC ............... *H04L 9/28* (2013.01); *H04L 9/0631* (2013.01); *H04L 2209/122* (2013.01)
USPC .......................................................... 380/28

(58) Field of Classification Search
CPC .... H04L 9/28; H04L 9/0631; H04L 2209/122
USPC .......................................................... 380/28
See application file for complete search history.

(56) References Cited

U.S. PATENT DOCUMENTS

| 6,219,336 B1 * | 4/2001 | Takahashi et al. ............ 370/223 |
| 7,890,747 B2 * | 2/2011 | Dempski et al. .............. 713/150 |
| 7,890,750 B2 * | 2/2011 | Dempski et al. .............. 713/153 |
| 8,379,843 B2 * | 2/2013 | Shirai et al. ...................... 380/28 |
| 8,824,671 B2 * | 9/2014 | Shirai et al. ...................... 380/28 |
| 2003/0068038 A1 * | 4/2003 | Hanounik ........................ 380/37 |
| 2003/0133568 A1 * | 7/2003 | Stein et al. ....................... 380/37 |
| 2004/0047466 A1 * | 3/2004 | Feldman et al. ................ 380/37 |
| 2004/0202317 A1 * | 10/2004 | Demjanenko et al. .......... 380/28 |
| 2005/0213756 A1 * | 9/2005 | Hubert ............................. 380/44 |
| 2006/0177052 A1 * | 8/2006 | Hubert ............................. 380/29 |
| 2007/0237326 A1 * | 10/2007 | Nonaka et al. .................. 380/37 |
| 2008/0008314 A1 * | 1/2008 | Dempski et al. ................ 380/37 |
| 2008/0019504 A1 * | 1/2008 | Han et al. ........................ 380/28 |
| 2008/0046756 A1 * | 2/2008 | Dempski et al. .............. 713/187 |

(Continued)

FOREIGN PATENT DOCUMENTS

| JP | 2001-266103 A | 9/2001 |
| JP | 2001-320358 A | 11/2001 |

(Continued)

OTHER PUBLICATIONS

U.S. Appl. No. 13/603,707, filed Sep. 5, 2012, Suzuki et al.

(Continued)

*Primary Examiner* — David García Cervetti
(74) *Attorney, Agent, or Firm* — Oblon, Spivak, McClelland, Maier & Neustadt, L.L.P.

(57) ABSTRACT

According to an embodiment, an arithmetic device includes an arithmetic processing unit, an address generating unit, and a control unit. The arithmetic processing unit performs a plurality of arithmetic processing used in an encryption method. Based on an upper bit of the address of the first piece of data and based on an offset which is a value corresponding to a counter value and which is based on the address of the first piece of data, the address generating unit generates addresses of the memory device. The control unit controls the arithmetic processing unit in such a way that the arithmetic processing is done in a sequence determined in the encryption method, and that specifies an update of the counter value at a timing of modifying the type of data and at a timing of modifying data.

4 Claims, 15 Drawing Sheets

(56) References Cited

U.S. PATENT DOCUMENTS

| | | | |
|---|---|---|---|
| 2008/0126766 A1* | 5/2008 | Chheda et al. | 712/226 |
| 2008/0267393 A1* | 10/2008 | Sano | 380/28 |
| 2010/0067687 A1* | 3/2010 | Chandramouli et al. | 380/37 |
| 2010/0195820 A1* | 8/2010 | Frank | 380/28 |
| 2010/0246814 A1* | 9/2010 | Olson et al. | 380/29 |
| 2011/0243319 A1* | 10/2011 | Shirai et al. | 380/28 |
| 2013/0083920 A1* | 4/2013 | Shirai et al. | 380/28 |
| 2013/0202105 A1* | 8/2013 | Shimizu | 380/28 |
| 2013/0238931 A1* | 9/2013 | Suzuki et al. | 714/15 |

FOREIGN PATENT DOCUMENTS

| | | |
|---|---|---|
| JP | 2004-325677 A | 11/2004 |
| JP | 2008-017490 A | 1/2008 |
| JP | 2013-118030 | 6/2013 |

OTHER PUBLICATIONS

National Institute of Standards and Technology (NIST), "Announcing the Advanced Encryption Standard (AES)", Federal Information Processing Standards Publication 197, Nov. 26, 2001, pp. 1-47 plus cover pages.

M. Feldhofer, et al., "AES implementation on a grain of sand", IEE Proceedings Information Security, vol. 152, 2005, pp. 13-20.

Office Action issued Jul. 22, 2014 in Japanese Patent Application No. 2011-184938 (with English language translation).

* cited by examiner

FIG.3

| INSTRUC-TION | DIFFERENT EXPRESSION | EXPLANATION |
|---|---|---|
| ld mem | Acc=mem | IN Acc, LOAD DATA STORED AT ADDRESS IN MEMORY DEVICE SPECIFIED BY mem |
| st mem | mem=Acc | AT ADDRESS IN MEMORY DEVICE SPECIFIED BY mem, WRITE DATA STORED IN Acc |
| xor mem | Acc=Acc xor mem | IN Acc, WRITE RESULT OF EXCLUSIVE-OR BETWEEN DATA STORED IN Acc AND DATA STORED AT ADDRESS IN MEMORY DEVICE SPECIFIED BY mem |
| sbox | Acc=SBOX (Acc) | IN Acc, WRITE RESULT OF IMPLEMENTING Sbox FUNCTION TO DATA STORED IN Acc |
| xtime | Acc=XTIME (Acc) | IN Acc, WRITE RESULT OF IMPLEMENTING xtime FUNCTION TO DATA STORED IN Acc |

FIG.4

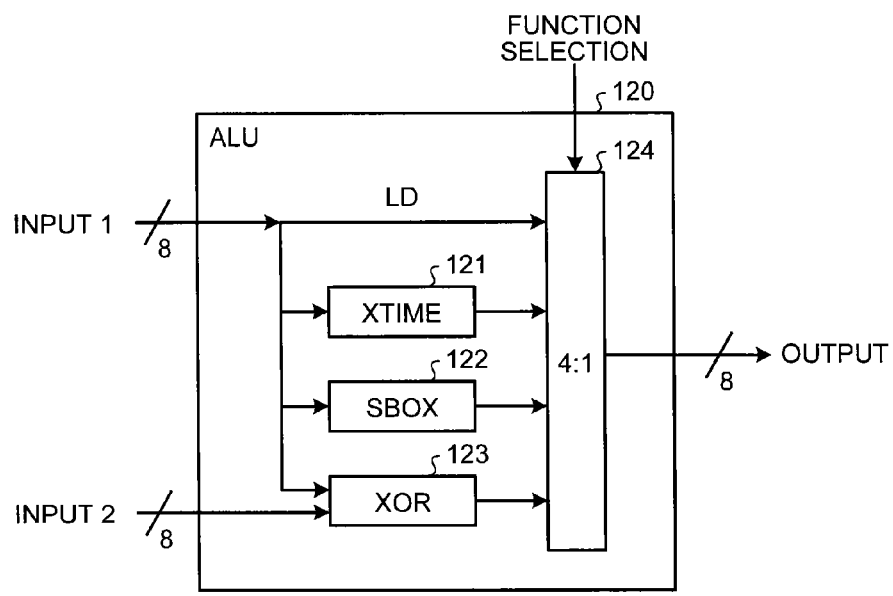

FIG.10

| ADDRESS | DATA |
|---|---|
| 00 | m[0] |
| 01 | m[1] |
| ⋮ | ⋮ |
| 0F | m[15] |
| 10 | k[0] |
| 11 | k[1] |
| ⋮ | ⋮ |
| 1F | k[15] |
| 20 | w[0] |
| 21 | w[1] |
| ⋮ | ⋮ |
| 2F | w[15] |
| 30 | rc |
| 31 | (EMPTY) |
| ⋮ | (EMPTY) |
| 3F | (EMPTY) |

FIG.12

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| kp(x) | 13 | 14 | 15 | 12 | 0 | 1 | 2 | 3 | 4 | 5 | 6 | 7 | 8 | 9 | 10 | 11 |
| sr(x) | 0 | 5 | 10 | 15 | 4 | 9 | 14 | 3 | 8 | 13 | 2 | 7 | 12 | 1 | 6 | 11 |
| ofs1(x) | 1 | 2 | 3 | 0 | 5 | 6 | 7 | 4 | 9 | 10 | 11 | 8 | 13 | 14 | 15 | 12 |
| ofs2(x) | 2 | 3 | 0 | 1 | 6 | 7 | 4 | 5 | 10 | 11 | 8 | 9 | 14 | 15 | 12 | 13 |
| ofs3(x) | 3 | 0 | 1 | 2 | 7 | 4 | 5 | 6 | 11 | 8 | 9 | 10 | 15 | 12 | 13 | 14 |

FIG.14

| state | code | read | write | func | acc_we | page | offset | ix | round | CONTROL | CORRESPONDING CODE |
|---|---|---|---|---|---|---|---|---|---|---|---|
| | | | | | | | | 0 | 0 | | |
| S01 | ld m[i] | 1 | 0 | LD | 1 | PM | ix | | | ↓ | |
| S01 | xor k[i] | 1 | 0 | XOR | 1 | PK | ix | | | ↓ | AddRoundKey: m=AK(m, k) |
| S03 | st m[i] | 0 | 1 | ARBI-TRARY | 0 | PM | ix | ix+1 | | if(ix !=15) S01 | |
| | | | | | | | | | 0 | | |
| S04 | ld k[kp(i)] | 1 | 0 | LD | 1 | PK | kp(ix) | | | if(ix >=4) S07 | |
| S05 | sbox | 0 | 0 | SBOX | 1 | ARBI-TRARY | ARBI-TRARY | | | if(ix !=0) S07 | |
| S06 | xor rc | 1 | 0 | XOR | 1 | PX | 0 | | | ↓ | KeyExpansion: k=KS(k) |
| S07 | xor k[i] | 1 | 0 | XOR | 1 | PK | ix | | | ↓ | |
| S08 | st k[i] | 0 | 1 | ARBI-TRARY | 0 | PK | ix | ix+1 | | if(ix !=15) S04 | |
| | | | | | | | | | 0 | | |
| S09 | ld m[i] | 1 | 0 | LD | 1 | PM | ix | | | ↓ | |
| S10 | sbox | 0 | 0 | SBOX | 1 | ARBI-TRARY | ARBI-TRARY | | | ↓ | SubBytes: m=SB(m) |
| S11 | st m[i] | 0 | 1 | ARBI-TRARY | 0 | PM | ix | ix+1 | | if(ix !=15) S09 | |
| | | | | | | | | | 0 | | |
| S12 | ld m[sr(i)] | 1 | 0 | LD | 1 | PM | sr(ix) | | | ↓ | ShiftRows: w=SR(m) |
| S13 | st w[i] | 0 | 1 | ARBI-TRARY | 0 | PW | ix | ix+1 | | if(ix !=15) S12 | |
| | | | | | | | | | 0 | | |
| S14 | (LOOP CONTROL) | 0 | 0 | ARBI-TRARY | 0 | ARBI-TRARY | ARBI-TRARY | | round+1 | if(round ==9) S29 | |
| | | | | | | | | | 0 | | |
| S15 | ld w[i] | 1 | 0 | LD | 1 | PW | ix | | | ↓ | |
| S16 | xor w[ofs1(i)] | 1 | 0 | XOR | 1 | PW | ofs1(ix) | | | ↓ | |
| S17 | xtime | 0 | 0 | XTIME | 1 | ARBI-TRARY | ARBI-TRARY | | | ↓ | |
| S18 | xor w[ofs1(i)] | 1 | 0 | XOR | 1 | PW | ofs1(ix) | | | ↓ | MixColumns: m=MC(w) |
| S19 | xor w[ofs2(i)] | 1 | 0 | XOR | 1 | PW | ofs2(ix) | | | ↓ | |
| S20 | xor w[ofs3(i)] | 1 | 0 | XOR | 1 | PW | ofs3(ix) | | | ↓ | |
| S21 | st m[i] | 0 | 1 | ARBI-TRARY | 0 | PW | ix | ix+1 | | if(ix !=15) S15 | |
| | | | | | | | | | | | |
| S22 | ld m[i] | 1 | 0 | LD | 1 | PM | ix | | | ↓ | |
| S23 | xor k[i] | 1 | 0 | XOR | 1 | PK | ix | | | ↓ | AddRoundKey: m=AK(m, k) |
| S24 | st m[i] | 0 | 1 | ARBI-TRARY | 0 | PM | ix | ix+1 | | if(ix !=15) S22 | |
| | | | | | | | | | | | |
| S25 | ld rc | 1 | 0 | LD | 1 | PX | 0 | | | ↓ | |
| S26 | xtime | 0 | 0 | XTIME | 1 | ARBI-TRARY | ARBI-TRARY | | | ↓ | |
| S27 | st rc | 0 | 1 | ARBI-TRARY | 0 | PX | 0 | | | ↓ | |
| | | | | | | | | | | | |
| S28 | (LOOP CONTROL) | | | | | | | | | goto S04 | |
| | | | | | | | | | | | |
| S29 | ld w[i] | 1 | 0 | LD | 1 | PW | ix | | | ↓ | |
| S30 | xor k[i] | 1 | 0 | XOR | 1 | PK | ix | | | ↓ | AddRoundKey: m=AK(w, k) |
| S31 | st m[i] | 0 | 1 | ARBI-TRARY | 0 | PM | ix | ix+1 | | if(ix !=15) S31 | |

FIG.15

| ITEM | EXPLANATION |
|---|---|
| state | STATE NUMBER |
| code | CODE OF FUNCTION IMPLEMENTED IN THAT STATE |
| read | READ SIGNAL WITH RESPECT TO MEMORY DEVICE |
| write | WRITE SIGNAL WITH RESPECT TO MEMORY DEVICE |
| func | ALU FUNCTION SELECTION |
| acc_we | WRITE SIGNAL WITH RESPECT TO ACCUMULATOR |
| page | UPPER TWO BITS OF ADDRESS<br>PM: UPPER TWO BITS OF BEGINNING ADDRESS OF m<br>PK: UPPER TWO BITS OF BEGINNING ADDRESS OF k<br>PW: UPPER TWO BITS OF BEGINNING ADDRESS OF w<br>Px: UPPER TWO BITS OF BEGINNING ADDRESS OF rc |
| offset | LOWER FOUR BITS OF ADDRESS |
| ix | OPERATION OF INDEX REGISTER |
| round | OPERATION OF ROUND COUNT |
| CONTROL | INDICATING STATE TO WHICH NEXT TRANSITION OCCURS<br>↓ INDICATES TRANSITION TO NEXT STATE |

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| kp(x) | 13 | 14 | 15 | 12 | 0 | 1 | 2 | 3 | 4 | 5 | 6 | 7 | 8 | 9 | 10 | 11 |
| sr(x) | 0 | 5 | 10 | 15 | 4 | 9 | 14 | 3 | 8 | 13 | 2 | 7 | 12 | 1 | 6 | 11 |
| ofs(x, 1) | 1 | 2 | 3 | 0 | 5 | 6 | 7 | 4 | 9 | 10 | 11 | 8 | 13 | 14 | 15 | 12 |
| ofs(x, 2) | 2 | 3 | 0 | 1 | 6 | 7 | 4 | 5 | 10 | 11 | 8 | 9 | 14 | 15 | 12 | 13 |
| ofs(x, 3) | 3 | 0 | 1 | 2 | 7 | 4 | 5 | 6 | 11 | 8 | 9 | 10 | 15 | 12 | 13 | 14 |

ARITHMETIC DEVICE

CROSS-REFERENCE TO RELATED APPLICATION(S)

This application is based upon and claims the benefit of priority from Japanese Patent Application No. 2011-184938, filed on Aug. 26, 2011; the entire contents of which are incorporated herein by reference.

FIELD

Embodiments described herein relate generally to an arithmetic device.

BACKGROUND

The Advanced Encryption Standard (AES) is a standard encryption method of the United States of America and is implemented in various fields. Various researches are being carried out related to the downsizing (i.e. reducing the circuit size of hardware) of the circuits that perform AES (called "AES arithmetic circuits").

However, the conventional technique may be insufficient for downsizing.

BRIEF DESCRIPTION OF THE DRAWINGS

FIG. 3 is a diagram for explaining the meaning of each instruction given in a pseudo-code;

FIG. 4 is a block diagram illustrating a configuration of an ALU according to the first embodiment;

FIG. 10 is a diagram illustrating an address space according to the first embodiment;

FIG. 12 is a diagram illustrating input-output of functions that correspond to the circuits illustrated in FIG. 11;

FIG. 14 is a diagram in which a detailed pseudo-code is rewritten in the form of a state transition table;

FIG. 15 is a diagram illustrating the meaning of each item in the state transition table;

DETAILED DESCRIPTION

Figure 1:
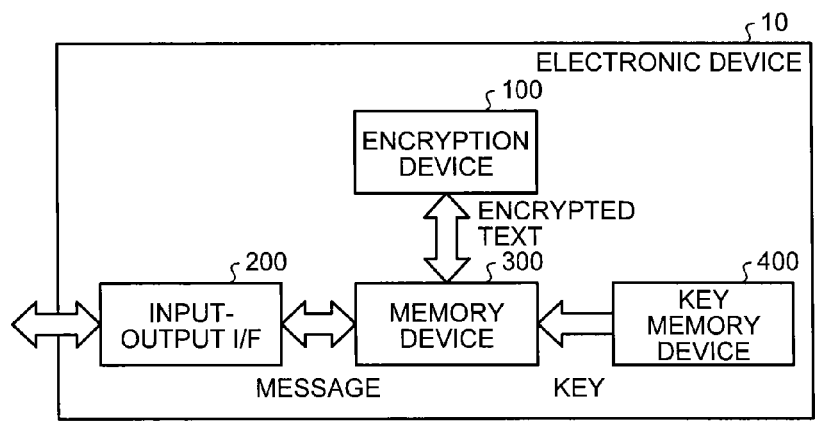
FIG. 1 is a block diagram illustrating a configuration of an electronic device that includes an encryption device according to a first embodiment.

According to an embodiment, an arithmetic device includes an arithmetic processing unit, an address generating unit, and a control unit. The arithmetic processing unit performs a plurality of arithmetic processing used in an encryption method. Based on an upper bit of the address of the first piece of data and based on an offset which is a value corresponding to a counter value and which is based on the address of the first piece of data, the address generating unit generates addresses of the memory device. The control unit controls the arithmetic processing unit in such a way that the arithmetic processing is done in a sequence determined in the encryption method, and that specifies an update of the counter value at a timing of modifying the type of data and at a timing of modifying data.

Preferred embodiments will be described below in detail with reference to the accompanying drawings. The following explanation is given for an example in which an arithmetic device is implemented in an encryption device (first embodiment) and a decryption device (second embodiment) in which the AES encryption method is adopted. However, the devices in which the arithmetic device can be implemented are not limited to this example.

First Embodiment

In the past research on downsizing an AES arithmetic circuit, the emphasis was on reducing the size of the entire AES arithmetic circuit also including memory elements. If an AES arithmetic circuit is to be used in a standalone manner, there is some significance in reducing the size of the entire AES arithmetic circuit. However, from a practical standpoint, an AES arithmetic circuit is embedded in some sort of an apparatus (electronic device). Hence, the size of the AES arithmetic circuit needs to be reduced while taking into account its usage condition. Until now, however, no research has been carried out on downsizing an AES arithmetic circuit that is embedded in some other device (or system).

Generally, in a system, a memory device such as a communication buffer (e.g., a random access memory (RAM)) is installed for various purposes. In an encryption device according to a first embodiment, such a memory device is diverted to be used also for an AES arithmetic circuit. This eliminates the need to install a separate memory device inside the AES arithmetic device, thereby enabling achieving further downsizing.

In this way, if a memory device in a system is diverted to be used also for an AES arithmetic circuit that is embedded in that system; then, from the perspective of the entire system, it makes sense to reduce the size of the AES arithmetic circuit excluding the memory elements. However, no research can be found that has considered downsizing of the AES arithmetic circuit based on such a perspective.

Explained below is an overview of the configuration of the encryption device according to the first embodiment. In essence, for AES encryption, arithmetic processing is performed in the units of bytes. ShiftRows represents shifting of 16 bytes in the units of bytes. In order to actually perform shifting with ShiftRows, a memory device serving as a buffer needs to be installed apart from the 16 bytes. MixColumns represents transformation in the units of four bytes. However, transformation cannot be performed unless all four bytes are received as input.

In the first embodiment, AES encryption is performed with only five bare minimum instructions (pseudo-instructions). The five instructions include three instructions for arithmetic processing (sbox, xtime, and xor) and two instructions for memory accessing (ld (load) and st (store)). Moreover, in order to store the result of arithmetic processing, an 8-bit accumulator is disposed as a register. Furthermore, a control unit is disposed that serves as a sequential machine and that performs AES encryption with hardware according to the abovementioned instructions. The details regarding the instructions and the constituent elements are given later.

FIG. 1 is a block diagram illustrating an example of a configuration of an electronic device 10 that includes an encryption device 100 according to the first embodiment. As illustrated in FIG. 1, the electronic device 10 includes the encryption device 100, an input-output interface (input-output I/F) 200, a memory device 300, and a key memory device 400.

The memory device 300 is used to store a variety of data handled in the electronic device 10. The memory device 300 is a storage medium from which the data can be accessed by specifying the address at which the data is stored. The memory device 300 can be configured with, for example, a RAM.

The input-output I/F 200 is an interface for communicating data with the outside according to the instructions issued by a control circuit (not illustrated). The key memory device 400 is used to store key information that is required during encryption. The encryption device 100 is connected to the memory device 300 and performs arithmetic processing according to the AES method. The memory device 300 can be configured with a page buffer RAM. The key memory device 400 can be configured with a NAND flash. The memory device 300 is a volatile memory or a nonvolatile memory. The key memory device 400 is a nonvolatile memory. Meanwhile, physically, the memory device 300 and the key memory device 400 can be configured using the same memory.

The control circuit performs AES encryption in, for example, the following manner:
(1) the control circuit reads the data (message) to be encrypted via the input-output I/F 200 and writes it in the memory device 300;
(2) the control circuit reads the key information from the key memory device 400 and writes it in the memory device 300; and
(3) the control circuit instructs the encryption device 100 to perform arithmetic processing. As a result, an encrypted text, which is the result of arithmetic processing, is written in the memory device 300.

Figure 2:
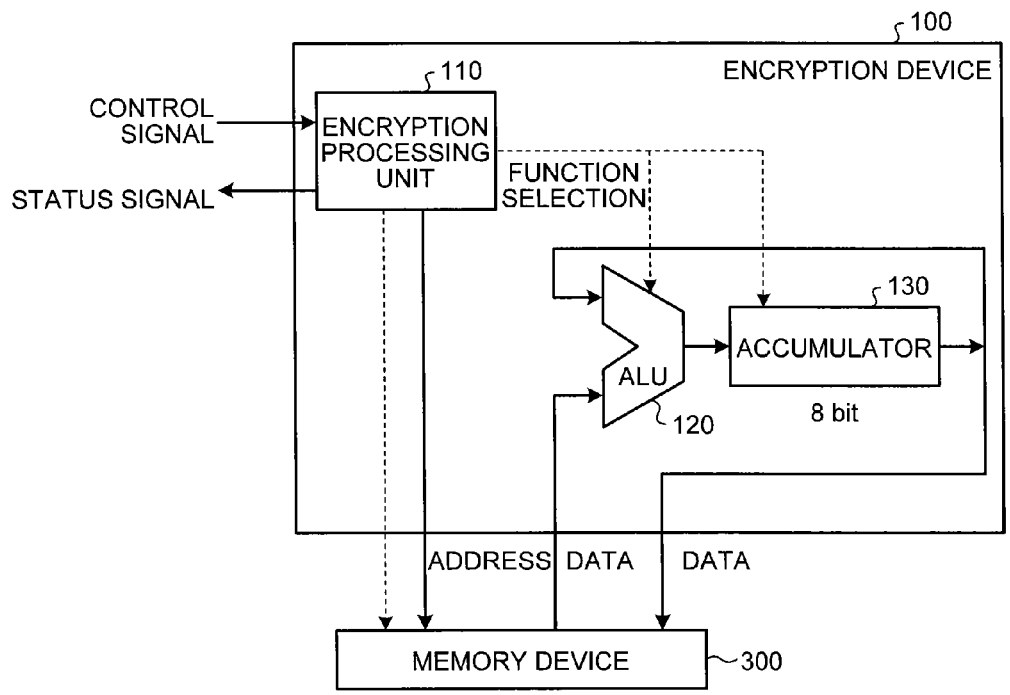
FIG. 2 is a block diagram illustrating a configuration of the encryption device according to the first embodiment.

FIG. 2 is a block diagram illustrating an example of a configuration of the encryption device 100 according to the first embodiment. As illustrated in FIG. 2, the encryption device 100 includes an encryption processing unit 110, an arithmetic logic unit (ALU) 120 that serves as the arithmetic processing unit, and an accumulator 130.

The encryption processing unit 110 controls, according to control signals sent by the control circuit of the electronic device 10 explained with reference to FIG. 1, arithmetic processing during AES encryption; and outputs status signals indicating the status of arithmetic processing. The details regarding the encryption processing unit 110 are given later.

The ALU 120 performs arithmetic processing according to the information that indicates the function selected by the encryption processing unit 110 (see "function selection" illustrated in FIG. 2). Moreover, when necessary, the ALU 120 performs arithmetic processing on the data stored at the address specified by the encryption processing unit 110.

The accumulator 130 is a register that is used to store the result of arithmetic processing performed by the ALU 120. The data stored in the accumulator 130 is written in the memory device 300 according to an instruction issued by the encryption processing unit 110.

While performing arithmetic processing during AES encryption, the encryption device 100 makes use of a part of the memory device 300. The breakdown of the necessary memory areas in the memory device 300 is as follows:
the size of the entire memory area to be used: 49 bytes
a message m received as an input: 16 bytes
a key k received as an input: 16 bytes
a work area w: 16 bytes
a round constant rc: 1 byte
Herein, the encrypted text, which is the result of arithmetic processing, is written over the message m.

The method of using the encryption device 100 illustrated in FIG. 2 is as follows:
write input data (the message m (16 bytes) and the key k (16 bytes) in the memory device 300;
start running the encryption device 100;
wait till the encryption device 100 ends running; and
since the result of arithmetic processing is written in the memory device 300, read the result of arithmetic processing from the memory device 300.

Herein, the explanation is given regarding a pseudo-code of encryption processing according to the AES encryption method in the first embodiment. Firstly, a pseudo-code in a simplified form (simple pseudo-code) is given.

```
//m=AES(m, k)
//input m: message, k: key
round=0
rc=0x01
m=AK(m, k)//AddRoundKey
while (1){
    k=KS(k)//KeyExpansion
    m=SB(m)//SubBytes
    w=SR(m)//ShiftRows
    round=round+1
    if (round==10) break;//exit while loop
    m=MC(w)//MixColumns
    m=AK(m, k)//AddRoundKey
    rc=xtime(rc)//rc update
}
m=AK(w, k)//AddRoundKey
```

Each function in the pseudo-code corresponds to a function defined in AES encryption in the following manner. The functions in AES encryption are defined in FIPS 197 (Federal Information Processing Standards Publication 197, the National Institute of Standards and Technology (NIST)).
AK: AddRoundKey
KS: KeyExpansion
MC: MixColumns
SB: SubBytes
SR: ShiftRows Given below is the AES pseudo-code in a detailed form (detailed pseudo-code). The detailed pseudo-code contains a substantiated code description of each function (AK, KS, SB, SR, and MC) written in the simple pseudo-code given above.

```
round=0
rc=0x01
//AddRoundKey: m=AK(m, k)
for (i=0; i<16; i++){
    ld m[i]
    xor k[i]
    st m[i]
```

-continued

```
}
while (1){
    //KeyExpansion: k=KS(k)
    for (i=0; i<16; i++){
        ld k[kp(i)]
        if (i<4){
            sbox
            if (i==0) xor rc
        }
        xor k[i]
        st k[i]
    }
    //SubBytes: m=SB(m)
    for (i=0; i<16; i++){
        ld m[i]
        sbox
        st m[i]
    }
    //ShiftRows: w=SR(m)
    for (i=0; i<16; i++){
        ld m[sr(i)]
        st w[i]
    }
    //loop control
    round=round+1
    if (round==10) break;//exit while loop
    //MixColumns: m=MC(w)
    for (i=0; i<16; i++){
        ld w[i]
        xor w[ofs1(i)]
        xtime
        xor w[ofs1(i)]
        xor w[ofs2(i)]
        xor w[ofs3(i)]
        st m[i]
    }
    //AddRoundKey: m=AK(m, k)
    for (i=0; i<16; i++){
        ld m[i]
        xor k[i]
        st m[i]
    }
    //rc update: rc=xtime(rc)
    ld rc
    xtime
    st rc
}
//AddRoundKey: m=AK(w, k)
for (i=0; i<16; i++){
    ld w[i]
    xor k[i]
    st m[i]
}
//end
```

FIG. 3 is a diagram for explaining the meaning of each instruction given in the pseudo-code. In FIG. 3, for each instruction, an expression for expressing that instruction in a different form (different expression) is given along with the details of that instruction. In FIG. 3, "Acc" corresponds to the accumulator 130, and "mem" corresponds to the data stored at the specified address in the memory device 300.

An XTIME function is, for example, a function for performing 8-bit input-output, and is expressed as Expression (1) given below. In Equation (1), msb(x) indicates the most significant bit of x.

$$(msb(x)==0)?(x<<1):(x<<1)\hat{\ }0x1b \qquad (1)$$

In this way, in the first embodiment, AES encryption is performed with the five instructions, namely, sbox, xtime, xor, ld, and st.

FIG. 4 is a block diagram illustrating an example of a configuration of the ALU 120 according to the first embodiment. As illustrated in FIG. 4, the ALU 120 includes an XTIME 121, an SBOX 122, an XOR 123, and a selector 124.

The XTIME 121, the SBOX 122, and the XOR 123 are circuits that execute the abovementioned three instructions (xtime, sbox, and xor, respectively) for arithmetic processing. The selector 124 selectively outputs any one of the following: data (LD) read from the memory device 300; the result of arithmetic processing performed by the SBOX 122; and the result of arithmetic processing performed by the XOR 123. In this way, the ALU 120 follows the function selection specified by the encryption processing unit 110, and performs arithmetic processing with one of the four instructions, namely, ld, xtime, sbox, and xor.

Figure 5:
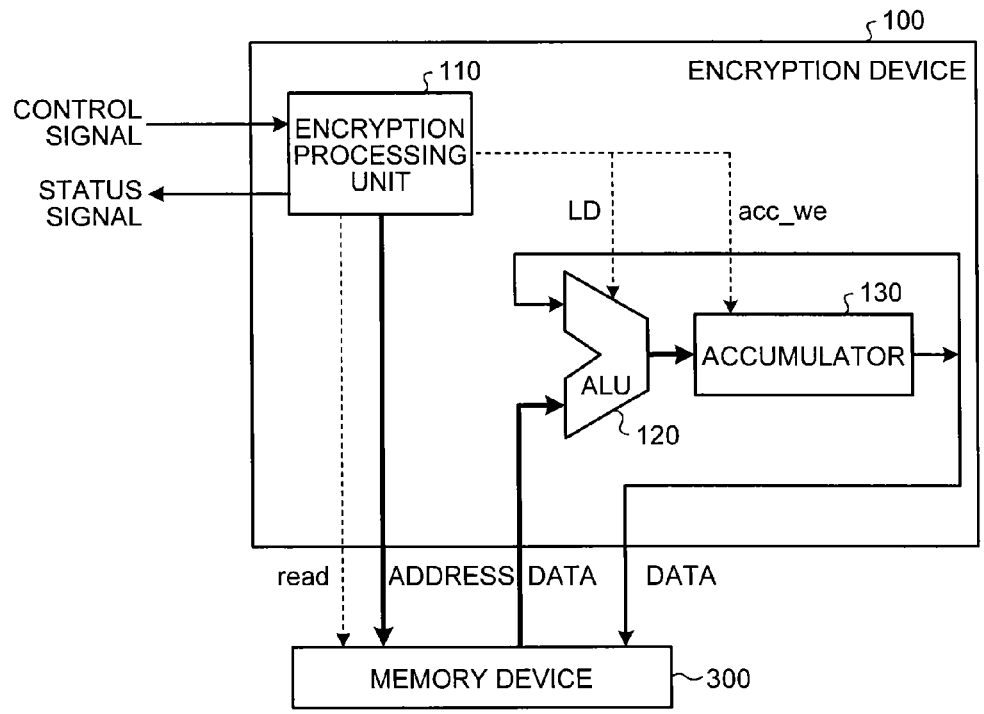
FIG. 5 is a diagram illustrating an example of processing an instruction "ld"

Explained below with reference to FIGS. 5 to 8 is a flow of operations performed in the encryption device 100 when the abovementioned five instructions are executed. FIG. 5 is a diagram illustrating an example of operations performed in the encryption device 100 when the instruction "ld" is executed.

In the instruction "ld", an address is specified (output) by the encryption processing unit 110. Then, the data stored at the specified address in the memory device 300 is read and is written in the accumulator 130 via the ALU 120. In FIG. 5, "acc-we" represents a signal that instructs writing of data in the accumulator 130. Moreover, in FIG. 5, "read" represents a signal that instructs reading of data from the memory device 300.

Figure 6:
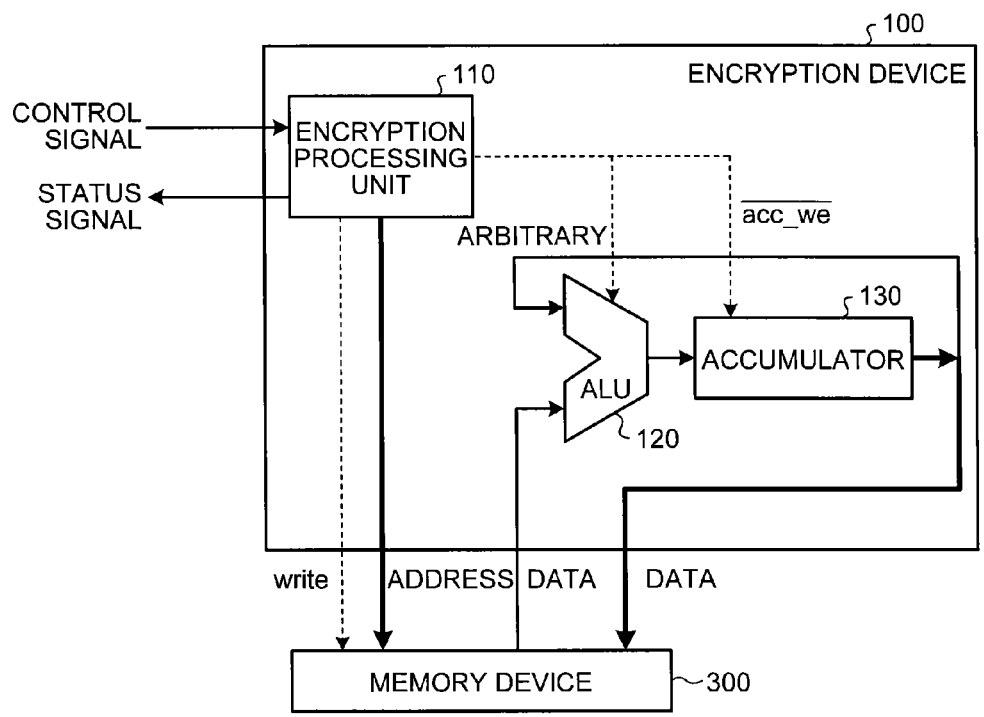
FIG. 6 is a diagram illustrating an example of processing an instruction "st"

FIG. 6 is a diagram illustrating an example of operations performed in the encryption device 100 when the instruction "st" is executed. In the instruction "st", an address is specified (output) by the encryption processing unit 110. Then, the data that has been stored in the accumulator 130 is written in the specified address in the memory device 300. In order to indicate that the data stored in the accumulator 130 is not modified, the acc-we signal is appended with an overbar that serves as a negator. In FIG. 6, "write" represents a signal that instructs writing of data in the memory device 300.

Figure 7:
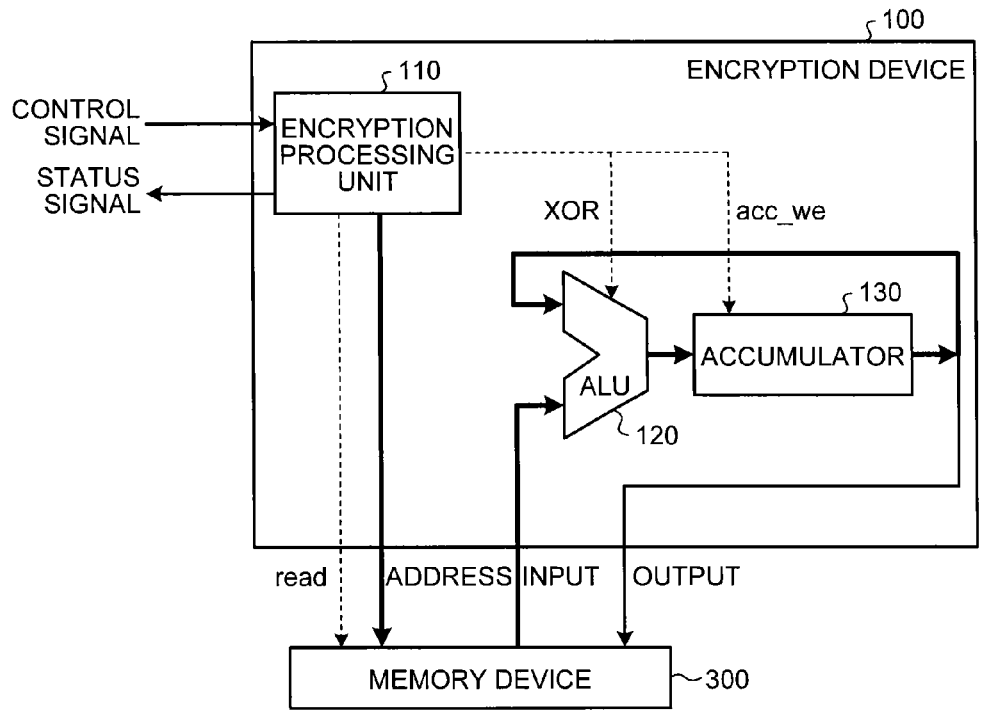
FIG. 7 is a diagram illustrating an example of processing an instruction "xor"

FIG. 7 is a diagram illustrating an example of operations performed in the encryption device 100 when the instruction "xor" is executed. In the instruction "xor", an address is specified (output) by the encryption processing unit 110. Then, in the accumulator 130 is written the result of an exclusive-OR operation performed between the data that has been stored in the accumulator 130 and the data stored at the specified address in the memory device 300.

Figure 8:
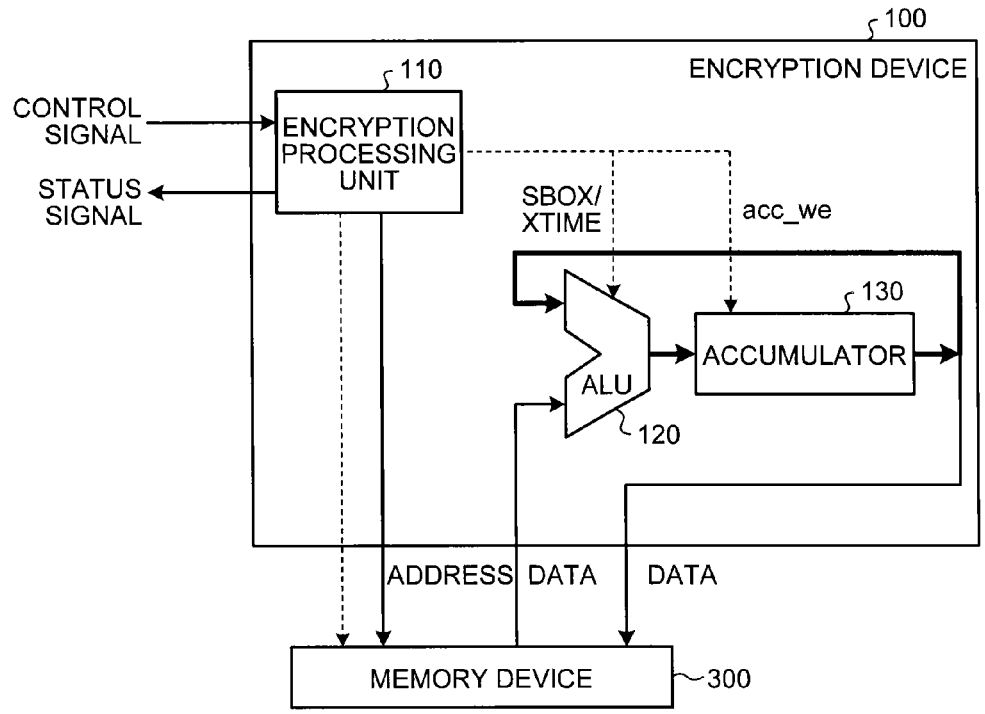
FIG. 8 is a diagram illustrating an example of processing an instruction "sbox" or an instruction "xtime"

FIG. 8 is a diagram illustrating an example of operations performed in the encryption device 100 when the instruction "sbox" or the instruction "xtime" is executed. Although the function used in the instruction "sbox" is different than the function used in the instruction "xtime", the operations are same. Hence, the explanation of those instructions is given together. With the instruction "sbox" (or the instruction "xtime"), in the accumulator 130 is written the result of implementing the SBOX function (or the XTIME function) to the data that has been stored in the accumulator 130.

Figure 9:
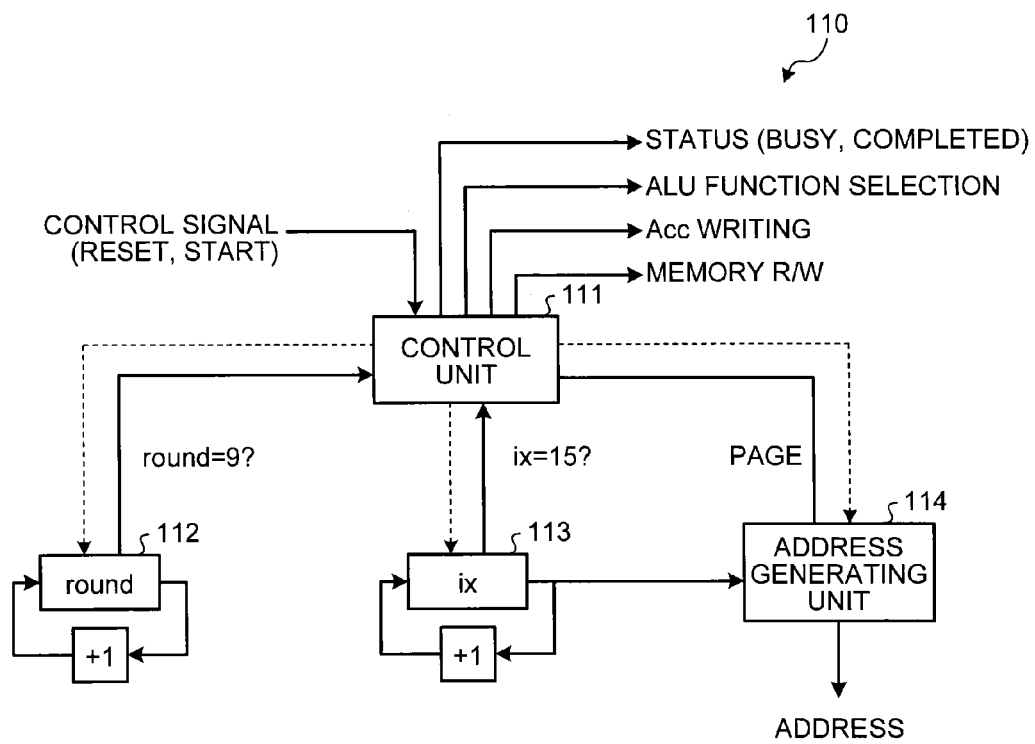
FIG. 9 is a block diagram illustrating a configuration of an encryption processing unit according to the first embodiment.

FIG. 9 is a block diagram illustrating an example of a configuration of the encryption processing unit 110 according to the first embodiment. As illustrated in FIG. 9, the encryption processing unit 110 includes a control unit 111, a round counter 112, an index register 113, and an address generating unit 114.

The control unit 111 follows control signals received from an external device such as the control circuit (not illustrated) of the electronic device 10, and outputs various control signals to control the arithmetic processing during encryption according to a sequence determined for AES encryption. In FIG. 9, dotted-lines indicate that control signals are output from the control unit 111 to other constituent elements. The details regarding the control signals are given later.

For example, the control unit 111 receives input of control signals such as signals for resetting the arithmetic processing of AES encryption and signals for instructing to start the arithmetic processing. In response, the control unit 111 outputs status signals indicating the status of arithmetic processing (such as busy, completed, etc.) to, for example, the constituent element from which the control signals were received.

Herein, "ALU function selection" represents a signal indicating the function (arithmetic processing) to be implemented with respect to the ALU 120. Moreover, "Acc writing" represents a signal for specifying whether or not to write data in the accumulator 130. Furthermore, "memory R/W" represents a signal for specifying whether to read (R) data from the memory device 300 or to write (W) data in the memory device 300.

The round counter 112 is a counter for counting the round count (round) of AES encryption. The round counter 112 can be configured with, for example, a flip-flop.

The index register 113 is a register for storing a counter value (ix) that is used by the address generating unit 114 in generating an address. In the first embodiment, a 4-bit counter value is stored in the index register 113.

The address generating unit 114 refers to the 2-bit value (page) that is output by the control unit 111 as well as refers to the 4-bit counter value ix that is stored in the index register 113, and accordingly generates a 6-bit address.

Given below is the explanation regarding an address space of the memory area in the memory device 300 that is used in the encryption device 100 according to first embodiment. FIG. 10 is a diagram illustrating an example of an address space according to the first embodiment.

In FIG. 10, an example is illustrated in which the message m, the key k, the work area w, and the round constant rc are stored in that order at consecutive addresses. However, the sequence of addresses is not limited to this example. Alternatively, for example, as long as the bytes of the 16-byte data (such as the message m or the key k) or the bytes of the 16-byte work area w are stored at consecutive addresses, the addresses for each piece of data or the work area may not be consecutive in nature.

Figure 11:
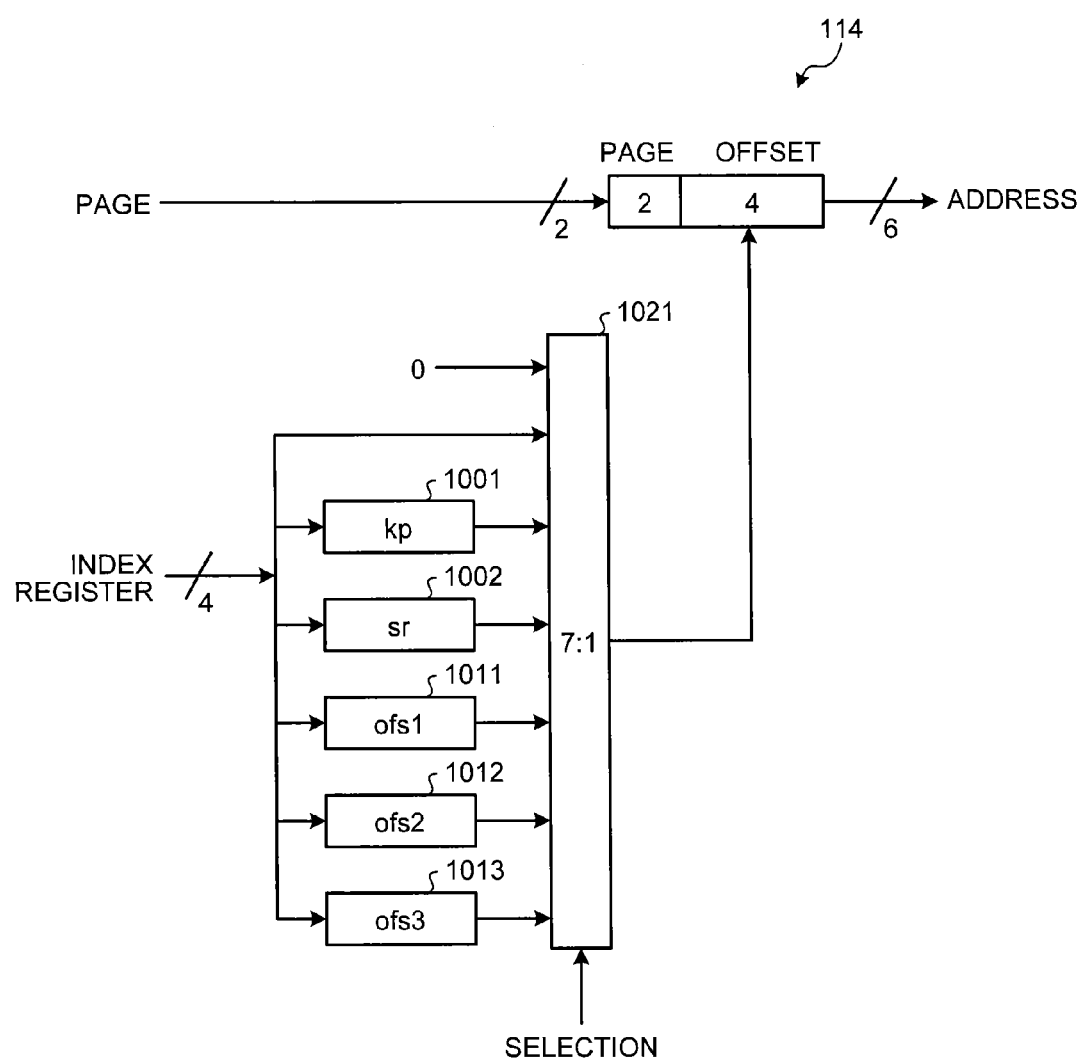
FIG. 11 is a block diagram illustrating a configuration of an address generating unit according to the first embodiment.

FIG. 11 is a block diagram illustrating an example of a configuration of the address generating unit 114 according to the first embodiment. As illustrated in FIG. 11, the address generating unit 114 includes a kp 1001, an sr 1002, an ofs1 (1011) (hereinafter, simply referred to as "osf1"), an ofs2 (1012) (hereinafter, simply referred to as "ofs2"), an ofs3 (1013) (hereinafter, simply referred to as "ofs3"), and a selector 1021.

Each of the kp 1001, the sr 1002, the ofs1, the ofs2, and the ofs3 is a circuit used for the conversion of the O-bit counter value ix that is input from an index register. FIG. 12 is a diagram illustrating an example of input-output of functions that correspond to the circuits illustrated in FIG. 11.

For example, kp(x) is a function that outputs "13" when the counter value ix (corresponding to "x" illustrated in FIG. 12) is "0". The function kp(x) reflects the fact that the data accessing sequence during key expansion (KeyExpansion) is 13, 14, 15, 12, 0, 1, 2, 3, 4, 5, 6, 7, 8, 9, 10, and 11. Meanwhile, sr(x) reflects the processing details of ShiftRows that represents shifting of 16 bytes.

ofs1(x) to ofs3(x) are functions by which a 2-bit "1" to a 2-bit "3" are respectively added to the lower two bits of x, while the upper two bits of x remain unchanged.

The selector 1021 follows instructions (dotted lines illustrated in FIG. 9) from the control unit 111, and selectively outputs any one of the following: 0; the counter value ix; the output of the kp 1001; the output of the sr 1002; the output of the ofs1; the output of the ofs2; and the output of the ofs3.

As illustrated in the upper right portion in FIG. 11, the address generating unit 114 outputs an address obtained by combining the 2-bit page received as input from the control unit 111 and the 4-bit value (equivalent to an offset) output by the selector 1021. Thus, the page accounts for the upper two bits of the page; and, for example, the result obtained by transformation of an index register with all functions accounts for the lower four bits of the address. The page is used as identification information for identifying the type of data used during the arithmetic processing and for identifying the work area in the memory device 300 used in the arithmetic processing. For example, the page is a four-valued page for enabling identification of the message m, the key k, the work area w, and the round constant rc. For that reason, in the first embodiment, the page is represented with two bits.

Figure 13:
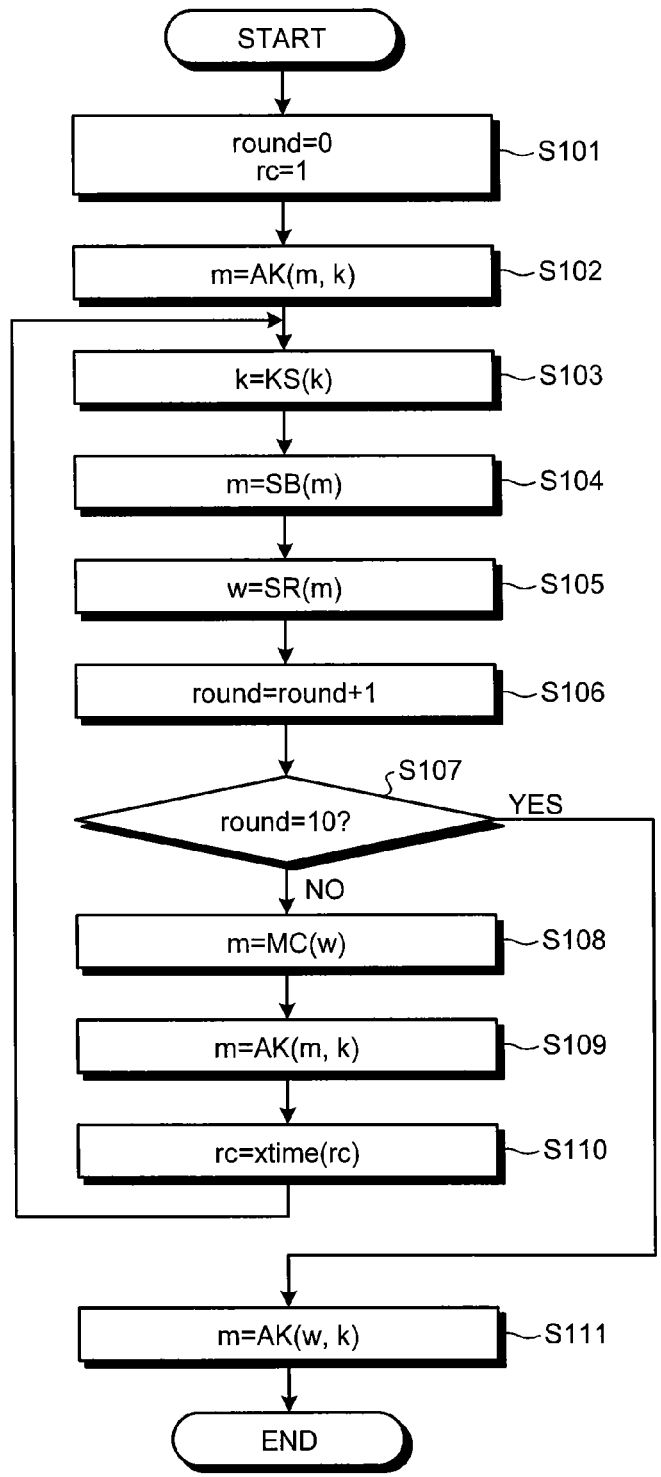
FIG. 13 is a flowchart for explaining operations performed during encryption processing according to the first embodiment.

Explained below with reference to FIG. 13 is the encryption processing performed by the encryption device 100 configured in the abovementioned manner according to the first embodiment. FIG. 13 is a flowchart for explaining an overall sequence of operations performed during the encryption processing according to the first embodiment. Herein, FIG. 13 represents a diagram in which the abovementioned simple pseudo-code for AES encryption is written in the form of a flowchart.

Firstly, the counter for the round count (round) is initialized to 0, and the round constant (rc) is initialized to 1 (Step S101). Then, AddRoundKey is executed and the message m is updated (Step S102). Subsequently, KeyExpansion is performed (Step S103), SubBytes is performed (Step S104), and ShiftRows is performed (Step S105) in that order; and the round count is incremented by 1 (Step S106).

If the round count has not reached 10 (No at Step S107); MixColumns is performed (Step S108), AddRoundKey is performed (Step S109), and xtime is performed (Step S110). Then, the system control returns to Step S103, and the operations are repeated. When the round count reaches 10 (Yes at Step S107), AddRoundKey is performed (Step S111). Then, the encryption processing is completed.

Although SR (ShiftRows) represents shifting of 16 bytes, overwriting results in deletion of the original values. Hence, the shifting is performed while copying the original values in the work area w, which is a separate area (Step S105). In C language, the operation at Step S105 can be written with the following code.

```
for (i=0; i<16; i++){
    w[i]=m[sr[i]];
}
```

In the code mentioned above, the variable sr is:
int sr[16]={0, 5, 10, 15, 4, 9, 14, 3, 8, 13, 2, 7, 12, 1, 6, 11};
Hence, the code mentioned above is same as making the following substitutions:
w[0]=m[0]
w[1]=m[5]
w[2]=m[10]
w[3]=m[15]
w[4]=m[4]
w[5]=m[9]
w[6]=m[14]
w[7]=m[3]
w[8]=m[8]
w[9]=m[13]
w[10]=m[2]

w[11]=m[7]
w[12]=m[12]
w[13]=m[1]
w[14]=m[6]
w[15]=m[11]

If the execution is carried out sequentially with only one variable, the values required from then on get deleted due to overwriting. Hence, the sequence is shuffled while copying the values in different variables.

Regarding MC (MixColumns) too, the issue of values being overwritten arises. Hence, conversion is performed while copying the values in different variables (Step S108).

In the AES encryption standard (FIPS 197), it is defined that calculation is to be done as:

$$m[0]=\text{xtime}(w[0])\hat{}\text{xtime}(w[1])\hat{}w[1]\hat{}w[2]\hat{}w[3]$$

On the other hand, since "xtime(a) ^xtime(b)=xtime(a^b)", xtime can be calculated as a whole in the following manner:

$$m[0]=\text{xtime}(w[0]\hat{}w[1])\hat{}w[1]\hat{}w[2]\hat{}w[3]$$

Regarding the MC in entirety, the following calculations are performed:

$$m[0]=\text{xtime}(w[0]\hat{}w[1])\hat{}w[1]\hat{}w[2]\hat{}w[3]$$

$$m[1]=\text{xtime}(w[1]\hat{}w[2])\hat{}w[2]\hat{}w[3]\hat{}w[0]$$

$$m[2]=\text{xtime}(w[2]\hat{}w[3])\hat{}w[3]\hat{}w[0]\hat{}w[1]$$

$$m[3]=\text{xtime}(w[3]\hat{}w[0])\hat{}w[0]\hat{}w[1]\hat{}w[2]$$

$$m[4]=\text{xtime}(w[4]\hat{}w[5])\hat{}w[5]\hat{}w[6]\hat{}w[7]$$

$$m[5]=\text{xtime}(w[5]\hat{}w[6])\hat{}w[6]\hat{}w[7]\hat{}w[4]$$

$$m[6]=\text{xtime}(w[6]\hat{}w[7])\hat{}w[7]\hat{}w[4]\hat{}w[5]$$

$$m[7]=\text{xtime}(w[7]\hat{}w[4])\hat{}w[4]\hat{}w[5]\hat{}w[6]$$

$$m[8]=\text{xtime}(w[8]\hat{}w[9])\hat{}w[9]\hat{}w[10]\hat{}w[11]$$

$$m[9]=\text{xtime}(w[9]\hat{}w[10])\hat{}w[10]\hat{}w[11]\hat{}w[8]$$

$$m[10]=\text{xtime}(w[10]\hat{}w[11])\hat{}w[11]\hat{}w[8]\hat{}w[9]$$

$$m[11]=\text{xtime}(w[11]\hat{}w[8])\hat{}w[8]\hat{}w[9]\hat{}w[10]$$

$$m[12]=\text{xtime}(w[12]\hat{}w[13])\hat{}w[13]\hat{}w[14]\hat{}w[15]$$

$$m[13]=\text{xtime}(w[13]\hat{}w[14])\hat{}w[14]\hat{}w[15]\hat{}w[12]$$

$$m[14]=\text{xtime}(w[14]\hat{}w[15])\hat{}w[15]\hat{}w[12]\hat{}w[13]$$

$$m[15]=\text{xtime}(w[15]\hat{}w[12])\hat{}w[12]\hat{}w[13]\hat{}w[14]$$

By taking into account the sequence of suffixes, xtime in the first embodiment is calculated in the following manner.

$$m[i]=\text{xtime}(w[i]\hat{}w[ofs1(i)])\hat{}w[ofs1(i)]\hat{}w[ofs2(i)]\hat{}w[ofs3(i)]$$

FIG. 14 is a diagram in which the detailed pseudo-code is rewritten in the form of a state transition table. FIG. 15 is a diagram illustrating the meaning of each item in the state transition table. The item "code" indicates the code of a function (instruction), from among the five instructions, that is implemented in each state. The item "read" indicates that "1" is set at the time of reading data from the memory device 300 and "0" is set at the time of not reading any data. The item "write" indicates that "1" is set at the time of writing data in the memory device 300 and "0" is set at the time of not writing any data. The item "func" indicates that one of the following is set: LD, XTIME, SBOX, XOR, and arbitrary (arithmetic processing by the ALU 120 is not performed). The item "acc_we" indicates that "1" is set at the time of writing data in the accumulator 130 and "0" is set at the time of not writing any data.

For example, at the state S01, a code "ld m[i]" is implemented. At that time, "read" signal is set to "1", "write" signal is set to "0", "func" is set to "LD", and "acc_we" is set to "1". Regarding the output of the address generating unit 114, the page is "PM" and the offset is "ix". Since the column "ix" and the column "round" indicate blank, no processing is performed. Since the column "control" indicates "↓", transition occurs to the next state S02.

At the state S03, the column "ix" indicates "ix+1" and the column "control" indicates "if (ix!=15) S01". It means that the value of ix is incremented by 1 to ix+1 and transition occurs to the state S01 when the pre-increment value of ix is not 15. When the value of ix is 15, transition occurs to the next state S04. As illustrated in FIG. 14, "ix" is updated at the timing at which the data to be subjected to each round of arithmetic processing is modified.

MODIFICATION EXAMPLE

Figure 16:
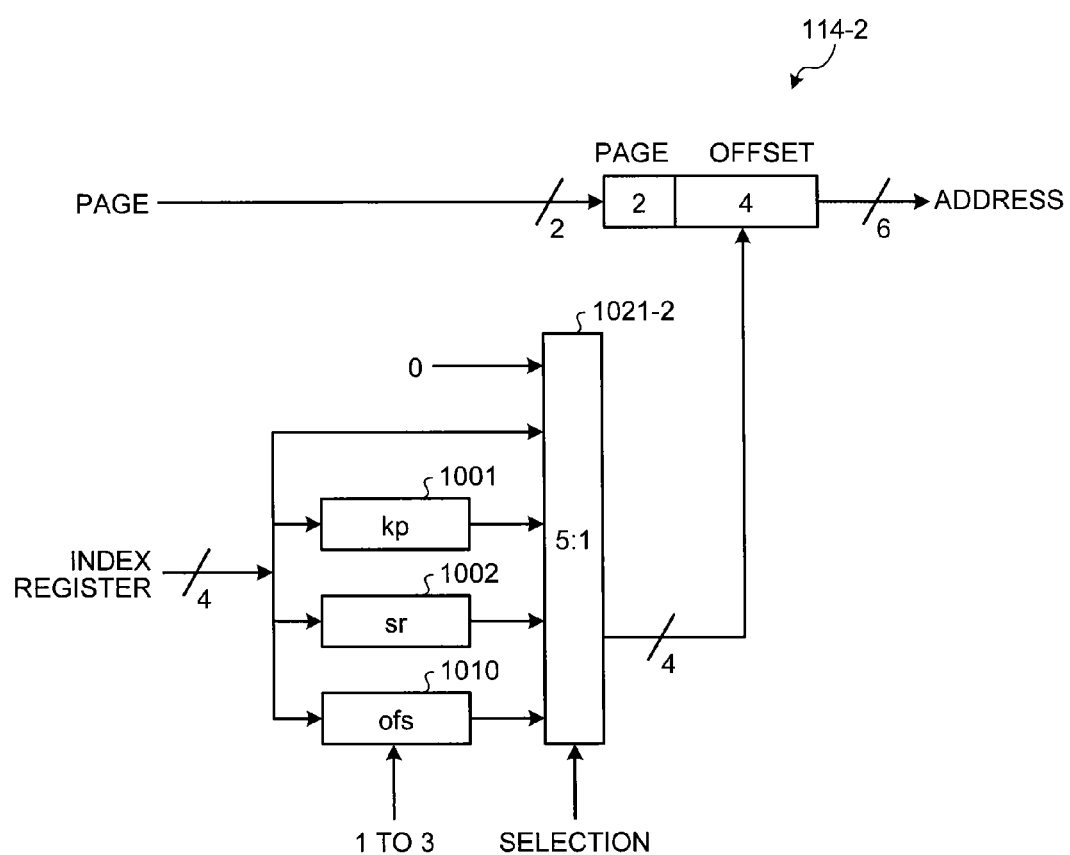
FIG. 16 is a block diagram illustrating a configuration of an address generating unit according to a modification example of the first embodiment.

FIG. 16 is a block diagram illustrating an example of a configuration of an address generating unit 114-2 according to a modification example of the first embodiment. As illustrated in FIG. 16, the address generating unit 114-2 includes the kp 1001, the sr 1002, an ofs 1010, and a selector 1021-2.

Figures 17, 18:
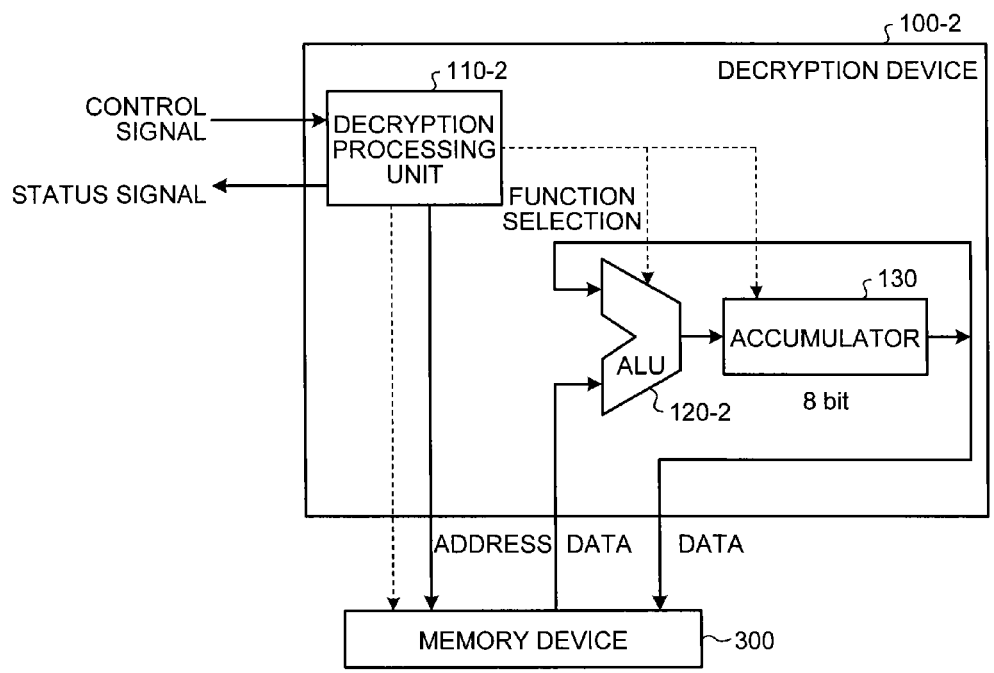
FIG. 17 is a diagram illustrating input-output of functions that correspond to the circuits illustrated in FIG. 16.
FIG. 18 is a block diagram illustrating a configuration of a decryption device according to a second embodiment.

In the modification example, in place of the three circuits of ofs1, ofs2, and ofs3 that output offsets, only a single circuit of the ofs 1010 is installed. The ofs 1010 is a circuit that converts the counter value ix using any one of the three functions ofs(x, 1), ofs(x, 2), and ofs(x, 3). A signal ("1~3" illustrated in FIG. 16) for specifying the function to be used from among the three functions ofs(x, 1), ofs(x, 2), and ofs(x, 3) is, for example, specified from the control unit 111. FIG. 17 is a diagram illustrating an example of input-output of functions that correspond to the respective circuits illustrated in FIG. 16.

The selector 1021-2 follows instructions from the control unit 111 and selectively outputs any one of the following: 0; the counter value ix; the output of the kp 1001; the output of the sr 1002; and the output of the ofs 1010. In such a configuration too, the functions identical to those explained with reference to FIG. 11 can be implemented.

In this way, in the arithmetic device (the encryption device) according to the first embodiment, an external memory device is used and the control is so performed that the data used in the arithmetic processing is stored in that memory device. This eliminates the need to install a memory device inside the AES arithmetic circuit, thereby enabling achieving further downsizing. Moreover, in the first embodiment, only the bare minimum circuits (such as XTIME, SBOX, and XOR) are installed in an ALU for performing the arithmetic processing. This too makes it possible to downsize the arithmetic device. Furthermore, in the first embodiment, each round of arithmetic processing during the encryption is performed in the units of a predetermined number of times. For example, every time the counter value of the index register reaches 15, each round of arithmetic processing is performed. That is, each round of arithmetic processing is performed in the units of 16 times. This eliminates the need to install a control circuit that is required in the case of a mismatch in the number of times. As a result, it becomes possible to further downsize the arithmetic device.

Second Embodiment

In a second embodiment, the explanation is given for an example in which an arithmetic device is implemented in a decryption device that adopts the AES encryption method. FIG. 18 is a block diagram illustrating an example of a configuration of a decryption device 100-2 according to the second embodiment. As illustrated in FIG. 18, the decryption device 100-2 includes a decryption processing unit 110-2, an arithmetic logic unit (ALU) 120-2 that serves as the arithmetic processing unit, and the accumulator 130.

The decryption processing unit 110-2 controls the arithmetic processing during decryption of AES encryption, and outputs a status signal indicating the status of arithmetic processing. The accumulator 130 is a register that is used to store the result of arithmetic processing performed by the ALU 120-2.

The ALU 120-2 performs arithmetic processing according to the information that indicates the function selected by the decryption processing unit 110-2. Moreover, when necessary, the ALU 120-2 performs arithmetic processing on the data stored at the address specified by the decryption processing unit 110-2.

Herein, the explanation is given regarding a pseudo-code of decryption processing according to the AES encryption method in the second embodiment. Given below is a pseudo-code in a simplified form (simple pseudo-code).

```
//m=invAES(m, k)
//input m: encrypted text, k: decoding key
round=0
rc=0x36
m=AK(m, k)//AddRoundKey
while (1){
    k=iKS(k)//invKeyExpansion
    m=iSB(m)//invSubBytes
    w=iSR(m)//invShiftRows
    round=round+1
    if (round==10) break;//exit while loop
    w=AK(w, k)//AddRoundKey
    m=iMC(w)//invMixColumns
    rc=ixtime(rc)//rc update
}
m=AK(w, k)//AddRoundKey
```

The functions that have "i" added as a prefix are inverse functions of the functions implemented during encryption. For example, the function iSB is the inverse function of the function SB.

The function iKS can be created using the instructions sbox and xor. The function iSB requires isbox, which is the inverse function of sbox. The function iMC can be created using the instruction xtime. The function ixtime can be created using the instruction xtime. Thus, it suffices the purpose if the ALU 120-2 includes circuits that can perform the following five types of arithmetic processing.

(1) LD
(2) XTIME
(3) SBOX
(4) ISBOX
(5) XOR

Figure 19:
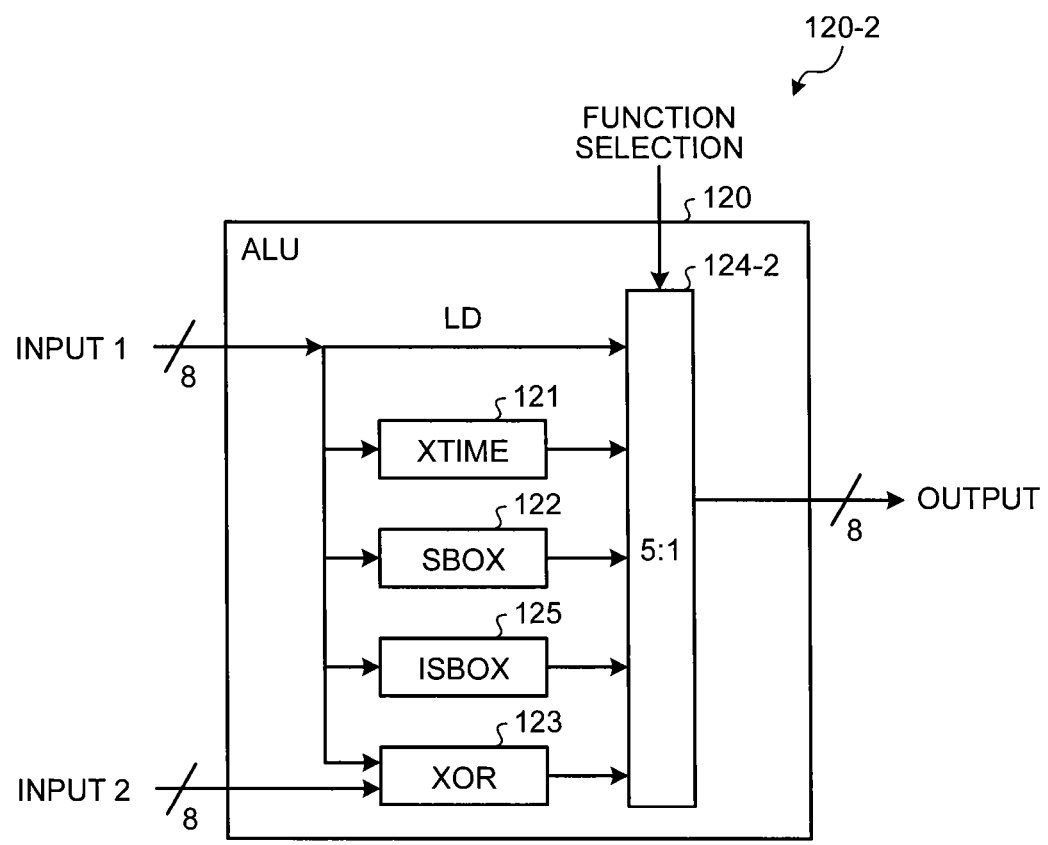
FIG. 19 is a block diagram illustrating a configuration of an ALU according to the second embodiment.

FIG. 19 is a block diagram illustrating a configuration of the ALU 120-2 configured in the manner described above according to the second embodiment. As illustrated in FIG. 19, the ALU 120-2 includes the XTIME 121, the SBOX 122, the XOR 123, a selector 124-2, and an ISBOX 125. Herein, the ISBOX 125 is a circuit that performs arithmetic processing equivalent to the inverse function of the SBOX 122.

The decryption processing unit 110-2 controls the arithmetic processing of the ALU 120-2 in such a way that decryption is performed with the abovementioned pseudo-code. In an identical manner to the encryption processing unit 110, the decryption processing unit 110-2 includes the control unit 111, the round counter 112, the index register 113, and the address generating unit 114. Moreover, in an identical manner to the encryption processing performed by the encryption processing unit 110, the decryption processing unit 110-2 can perform decryption processing of AES encryption. Meanwhile, the decryption processing can also be performed with the configuration of the ALU 120-2 illustrated in FIG. 19. In that case, the operations explained with reference to FIG. 4 are performed, and function selection of ISBOX is not specified.

Figure 20:
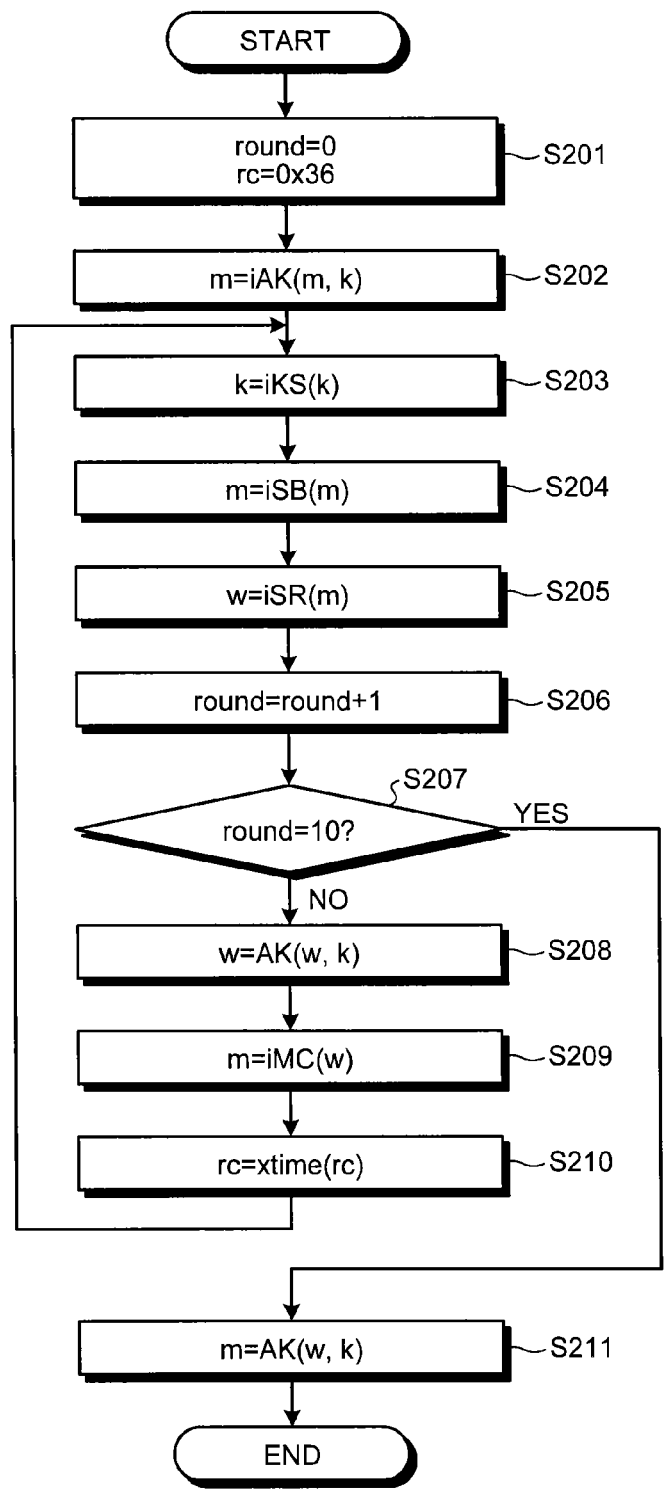
FIG. 20 is a flowchart for explaining operations performed during decryption processing according to the second embodiment.

Explained below with reference to FIG. 20 is the decryption processing performed by the decryption device 100-2 configured in the manner described above according to the second embodiment. FIG. 20 is a flowchart for explaining an overall sequence of operations performed during the decryption processing according to the second embodiment.

Firstly, the counter for the round count (round) is initialized to 0 and the round constant (rc) is initialized to 0x36 (hexadecimal 36) (Step S201). Then, inverse AddRoundKey (iAK) is executed and the message m is updated (Step S202). Subsequently, inverse KeyExpansion (iKS) is performed (Step S203), inverse SubBytes (iSB) is performed (Step S204), and inverse ShiftRows (iSR) is performed (Step S205) in that order; and the round count is incremented by 1 (Step S206).

If the round count has not reached 10 (No at Step S207); AddRoundKey is performed (Step S208), inverse MixColumns (iMC) is performed (Step S209), and inverse xtime (ixtime) is performed (Step S210). Then, the system control returns to Step S203, and the operations are repeated. When the round count reaches 10 (Yes at Step S207), AddRoundKey is performed (Step S211). Then, the decryption processing is completed.

Thus, as described above, according to the first and second embodiments, an arithmetic device need not include a memory device for storing the data that is used during arithmetic processing. This enables achieving downsizing of the arithmetic device. For example, when an AES arithmetic circuit is installed inside a memory card, it becomes possible to further downsize the AES arithmetic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device connected to a memory device, the arithmetic device comprising:
    an arithmetic processing circuit configured to perform a plurality of arithmetic processes, the plurality of arithmetic processes being executed in a sequence according to an encryption method;
    an address generating circuit configured to generate addresses in the memory device, which stores, in consecutive addresses, N pieces of data (N being an integer) for each of a plurality of types of data used for the plurality of arithmetic processes, based on an upper bit and an offset, the upper bit being an upper bit of an address of a first piece of data from among the N pieces of data for one of the plurality of types of data, and the offset being a value corresponding to a counter value and being based on the address of the first piece of data; and a controller configured to control the arithmetic processing circuit so that each of the plurality of arithmetic processes is executed in the sequence and to specify an update of the counter value at a timing of modifying the type of the data and at a timing of modifying the data used in the plurality of arithmetic processes.

2. The arithmetic device according to claim 1, wherein the encryption method is an Advanced Encryption Standard (AES) encryption method.

3. The arithmetic device according to claim 2, wherein the plurality of arithmetic processes include sbox, xtime, and xor, which are defined in the AES encryption method, as well as a loading operation for reading the data from the memory data.

4. The arithmetic device according to claim 2, wherein the plurality of arithmetic processes include sbox, isbox, xtime, and xor, which are defined in the AES encryption method, as well as a loading operation for reading the data from the memory data.

* * * * *